US012563502B2

(12) United States Patent
Di Taranto et al.

(10) Patent No.: US 12,563,502 B2
(45) Date of Patent: Feb. 24, 2026

(54) JOINT UPLINK/DOWNLINK (DL/UL) SCHEDULING AND PARAMETER SELECTION FOR CONSTRAINED SIMULTANEOUS TRANSMIT AND RECEIVE (STR) ACCESS POINT (AP) MULTI-LINK DEVICES

(71) Applicant: Telefonaktiebolaget LM Ericsson (publ), Stockholm (SE)

(72) Inventors: Rocco Di Taranto, Lund (SE); Leif Wilhelmsson, Lund (SE); Abhishek Ambede, Huddinge (SE); Miguel Lopez, Aachen (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 239 days.

(21) Appl. No.: 18/257,495

(22) PCT Filed: Dec. 16, 2020

(86) PCT No.: PCT/EP2020/086551
§ 371 (c)(1),
(2) Date: Jun. 14, 2023

(87) PCT Pub. No.: WO2022/128087
PCT Pub. Date: Jun. 23, 2022

(65) Prior Publication Data
US 2024/0040516 A1 Feb. 1, 2024

(51) Int. Cl.
*H04W 52/26* (2009.01)
*H04W 52/34* (2009.01)
(Continued)

(52) U.S. Cl.
CPC ....... *H04W 52/262* (2013.01); *H04W 52/346* (2013.01); *H04W 72/121* (2013.01); *H04W 72/541* (2023.01); *H04W 76/15* (2018.02)

(58) Field of Classification Search
CPC ............ H04W 52/262; H04W 52/346; H04W 72/121; H04W 72/541; H04W 76/15
See application file for complete search history.

(56) References Cited

U.S. PATENT DOCUMENTS

| | | |
|---|---|---|
| 2017/0034837 A1 | 2/2017 | Lopez-Perez et al. |
| 2017/0257184 A1* | 9/2017 | Stirling-Gallacher ...................... H04L 1/0026 |

(Continued)

FOREIGN PATENT DOCUMENTS

| | | |
|---|---|---|
| WO | 2017171746 A1 | 10/2017 |
| WO | 2018064179 A1 | 4/2018 |
| WO | 2021009992 A1 | 1/2021 |

OTHER PUBLICATIONS

Japanese Office Action dated Oct. 1, 2024 for Japanese Patent Application No. 2023-534901; consisting of 8 pages.

(Continued)

*Primary Examiner* — Kashif Siddiqui
(74) *Attorney, Agent, or Firm* — Weisberg I.P. Law, P.A.

(57) ABSTRACT

Apparatuses and methods are disclosed for joint downlink/uplink (DL/UL) scheduling and parameter selection for constrained simultaneous transmit and receive (STR) access point (AP) multi-link devices (MLDs). In one embodiment, a STR capable MLD includes an AP STA. The MLD is configured to jointly schedule an uplink communication on a first link and a simultaneous downlink communication on a second link by selecting a first non-access point (non-AP) station (STA) for the uplink communication and a second non-AP STA for the simultaneous downlink communication out of a plurality of non-AP STAs, the first and second links being a STR constrained pair of links, the first link being associated with the first non-AP STA, the second link being (Continued)

BEGIN

Jointly schedule an uplink communication on a first link and a simultaneous downlink communication on a second link by selecting a first non-access point, non-AP, station, STA for the uplink communication and a second non-AP STA for the simultaneous downlink communication out of a plurality of non-AP STAs, the first and second links being a STR constrained pair of links, the first link being associated with the first non-AP STA, the second link being associated with the second non-AP STA, and the first and second non-AP STAs being affiliated with different MLDs
S100

END associated with the second non-AP STA, and the first and second non-AP STAs not being affiliated with a same MLD.

14 Claims, 4 Drawing Sheets

(51) Int. Cl.

| | |
|---|---|
| *H04W 72/121* | (2023.01) |
| *H04W 72/541* | (2023.01) |
| *H04W 76/15* | (2018.01) |

(56) References Cited

U.S. PATENT DOCUMENTS

| | | | | |
|---|---|---|---|---|
| 2018/0084548 | A1* | 3/2018 | Min | H04L 5/0014 |
| 2018/0097605 | A1* | 4/2018 | Min | H04L 5/14 |
| 2018/0152949 | A1* | 5/2018 | Guo | H04W 72/541 |
| 2019/0150214 | A1 | 5/2019 | Zhou et al. | |
| 2020/0014576 | A1 | 1/2020 | Cherian et al. | |
| 2020/0221545 | A1 | 7/2020 | Stacey et al. | |
| 2020/0229112 | A1 | 7/2020 | John Wilson et al. | |
| 2020/0288523 | A1 | 9/2020 | Patil et al. | |
| 2020/0351908 | A1* | 11/2020 | Wilkinson | H04W 72/54 |
| 2022/0021431 | A1* | 1/2022 | Zhang | H04B 7/0617 |
| 2022/0070791 | A1 | 3/2022 | Kim et al. | |
| 2022/0417955 | A1* | 12/2022 | Zhang | H04W 72/046 |
| 2024/0031117 | A1* | 1/2024 | Ambede | H04L 5/143 |

OTHER PUBLICATIONS

Monajemi, P., et al., STR Capability Report, doc.: IEEE 802.11-20/0809r0, Cisco, Apr. 10, 2020; consisting of 12 pages.

Naribole, S., et al., MLO Constraint Indication and Operating Mode; doc.: IEEE 802.11-20/0226r5, Samsung, Mar. 15, 2020; consisting of 28 pages.

Zhou, Y., et al., Simultaneous Tx/Rx Capability indication for multi-link operation, Doc.: IEEE 802.11-19/1550r1, Huawei, Sep. 2019, consisting of 10 pages.

International Search Report and Written Opinion dated Oct. 8, 2021 for International Application No. PCT/EP2020/085331 filed Dec. 9, 2020, consisting of 10-pages.

International Search Report and Written Opinion dated Oct. 8, 2021 for International Application No. PCT/EP2020/086551 filed Dec. 16, 2020, consisting of 12-pages.

Y. Zhou et al.; Simultaneous Tx/Rx Capability indication for multi-link operation; IEEE 802.11-19/1550r1; Sep. 2019, consisting of 10-pages.

Y. Li et al.; Discussion about STR Capabilities Indication; IEEE 802.11-20/0921r4; Jun. 20, 2020, consisting of 17-pages.

E. Au; Specification Framework for TGbe; IEEE P802.11 Wireless LANs 19/1262r13; Aug. 20, 2020; consisting of 56-pages.

E. Au; Compendium of straw polls and potential changes to the Specification Framework Document; IEEE P802.11 Wireless LANs 20/0566r58; Aug. 20, 2020; consisting of 166-pages.

G. Naik et al.; Next Generation Wi-Fi and 5G NR-U in the 6 GHz Bands: Opportunities & Challenges; arXiv; Computer Science>Networking and Internet Architecture; Jul. 30, 2020, consisting of 29-pages.

U.S. Office Action dated Aug. 13, 2025 for U.S. Appl. No. 18/255,886, consisting of 35 pages.

Japanese Decision Grant Patent and English Machine Translation dated Dec. 23, 2025; Application No. 2023-534901; consisting of five pages.

* cited by examiner

10

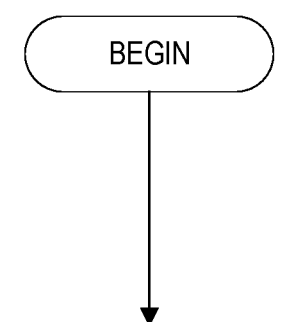

BEGIN

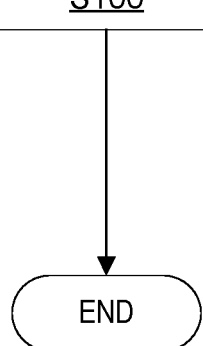

Jointly schedule an uplink communication on a first link and a simultaneous downlink communication on a second link by selecting a first non-access point, non-AP, station, STA for the uplink communication and a second non-AP STA for the simultaneous downlink communication out of a plurality of non-AP STAs, the first and second links being a STR constrained pair of links, the first link being associated with the first non-AP STA, the second link being associated with the second non-AP STA, and the first and second non-AP STAs being affiliated with different MLDs
S100

END

FIG. 3

JOINT UPLINK/DOWNLINK (DL/UL) SCHEDULING AND PARAMETER SELECTION FOR CONSTRAINED SIMULTANEOUS TRANSMIT AND RECEIVE (STR) ACCESS POINT (AP) MULTI-LINK DEVICES

CROSS-REFERENCE TO RELATED APPLICATION

This application is a Submission Under 35 U.S.C. § 371 for U.S. National Stage Patent Application of International Application Number: PCT/EP2020/086551, filed Dec. 16, 2020 entitled "JOINT UPLINK/DOWNLINK (DL/UL) SCHEDULING AND PARAMETER SELECTION FOR CONSTRAINED SIMULTANEOUS TRANSMIT AND RECEIVE (STR) ACCESS POINT (AP) MULTI-LINK DEVICES," the entirety of which is incorporated herein by reference.

TECHNICAL FIELD

The present disclosure relates to wireless communication and in particular, to joint downlink/uplink (DL/UL) scheduling and parameter selection for constrained simultaneous transmit and receive (STR) access point (AP) multi-link devices (MLDs).

BACKGROUND

There is an increased interest in using unlicensed bands, due to their many desirable properties. One of these properties is the very large amount of available spectrum, especially with the recent ruling of the Federal Communication Commission (FCC), where an additional 1.2 GHz of unlicensed spectrum has been made available between 5.9 and 7.1 GHz.

One approach to take advantage of the large bandwidth is to support multi-link (ML) transmission, a feature that has been introduced in the Institute of Electrical Engineers (IEEE) 802.11be wireless local area network (WLAN) standard amendment which is currently under development. A multi-link device (MLD) has multiple affiliated stations (STAs), each of which can communicate using its own wireless channels (links). Communication over multiple links by an MLD is termed as multi-link operation (MLO). It should be noted that in the context of this disclosure, the terms 'channels' and 'links' are used interchangeably. For example, an MLD may include two radio chains corresponding to two affiliated STAs. If this MLD can perform independent access across multiple links, such MLD can in principle use two links to support 1) two concurrent downlink (DL) transmissions, 2) two concurrent uplink (UL) transmissions, and/or 3) even one DL and one UL transmission at the same time (i.e., simultaneously).

However, in practice, there may be limitations to the actions that the STAs within the same MLD may perform due to, for example, what is known as in-device interference (also called self-interference or "SI"). This refers to the detrimental leakage between the radio chains of the STAs within the same MLD and typically happens when one STA within the MLD is transmitting, at the same time that another STA within the same MLD is receiving. Thus, transmission and simultaneous reception within the same MLD may be quite challenging to implement in practice.

MLDs may be classified as one of the following classifications according to their capabilities on the supported links: 1) simultaneous transmit and receive (STR) capable, 2) non-STR capable, and c) constrained STR. A non-STR MLD is not capable of simultaneously transmitting and receiving (TX/RX) on multiple links (i.e., it can perform only concurrent transmissions, TX/TX, or concurrent receptions, RX/RX, on all links). An STR capable MLD is capable of simultaneous TX/RX on multiple links (i.e., it can perform TX/RX on all links). On the other hand, a constrained STR MLD is capable of simultaneous TX/RX on multiple links under certain specific conditions that may depend on certain factors. A constrained STR MLD may be STR capable for some combinations of values of communication parameters and may be non-STR capable for some other combinations.

In the context of this disclosure, an access point (AP) MLD denotes an MLD with two or more affiliated access point (AP) STAs, whereas a non-AP MLD denotes an MLD with two or more affiliated non-AP STAs. Scheduling algorithms at an AP MLD are relatively straightforward to design for STR-capable and non-STR capable AP MLDs. For example, given the links' availability, it is either possible or not possible to schedule concurrent/simultaneous DL and UL transmissions independently and operations on links generally do not affect each other. However, for a constrained STR AP MLD, the impact on STR capability is due to different factors. Thus, scheduling algorithms at a constrained STR AP MLD are not as straightforward, as compared to STR-capable and non-STR capable AP MLDs. There is therefore a need to provide arrangements for efficient scheduling for constrained STR AP MLDs.

SUMMARY

Some embodiments advantageously provide a method and system for joint DL/UL scheduling and parameter selection for constrained STR AP MLDs.

According to an aspect of the present disclosure, a simultaneous transmit and receive, STR, capable multi-link device, MLD, comprising an access point, AP, station, STA, is provided. The MLD includes processing circuitry. The processing circuitry is configured to cause the MLD to jointly schedule an uplink communication on a first link and a simultaneous downlink communication on a second link by selecting a first non-access point, non-AP, station, STA for the uplink communication and a second non-AP STA for the simultaneous downlink communication out of a plurality of non-AP STAs, the first and second links being a STR constrained pair of links, the first link being associated with the first non-AP STA, the second link being associated with the second non-AP STA, and the first and second non-AP STAs not being affiliated with a same MLD.

In some embodiments of this aspect, the processing circuitry is configured to cause the MLD to jointly schedule the simultaneous uplink and downlink communication by being further configured to cause the MLD to select at least one of at least one first communication parameter value for the uplink communication and at least one second communication parameter value for the simultaneous downlink communication. In some embodiments of this aspect, the processing circuitry is configured to cause the MLD to: select the first non-AP STA for the uplink communication and the second non-AP STA for the simultaneous downlink communication out of the plurality of non-AP STAs based at least in part on path loss estimates for the plurality of non-AP STAs.

In some embodiments of this aspect, the at least one of the at least one first communication parameter value and the at least one second communication parameter value comprises a value of at least one of a transmit power, a signal bandwidth and a modulation and coding scheme, MCS, for the respective uplink and simultaneous downlink communications. In some embodiments of this aspect, the processing circuitry is configured to cause the MLD to select at least one of: the at least one first communication parameter value, the at least one second communication parameter value and the first and second non-AP STAs based at least in part on a path loss estimate for each of the first and second non-AP STAs.

In some embodiments of this aspect, the processing circuitry is configured to cause the MLD to select at least one of: the at least one first communication parameter value, the at least one second communication parameter value and the first and second non-AP STAs based at least in part on a signal to self-interference, SI, plus noise ratio for the uplink communication. In some embodiments of this aspect, the processing circuitry is configured to cause the MLD to select at least one of: the at least one first communication parameter value, the at least one second communication parameter value and the first and second non-AP STAs based at least in part on a signal-to-noise ratio, SNR, for the downlink communication. In some embodiments of this aspect, the processing circuitry is configured to cause the MLD to select at least one of: the at least one first communication parameter value, the at least one second communication parameter value and the first and second non-AP STAs based at least in part on a signal to self-interference, SI, plus noise ratio for the uplink communication and a signal-to-noise ratio, SNR, for the downlink communication.

In some embodiments of this aspect, the processing circuitry is configured to cause the MLD to select at least one of: the at least one first communication parameter value, the at least one second communication parameter value and the first and second non-AP STAs based at least in part on a frequency separation between the first and second links. In some embodiments of this aspect, the processing circuitry is configured to cause the MLD to select at least one of: the at least one first communication parameter value, the at least one second communication parameter value and the first and second non-AP STAs based at least in part on information about at least one modulation and coding scheme, MCS, associated with a signal bandwidth for the downlink communication and at least one of a maximum transmit power value and a self-interference, SI, suppression value at the MLD.

In some embodiments of this aspect, the processing circuitry is configured to cause the MLD to select at least one of: the at least one first communication parameter value, the at least one second communication parameter value and the first and second non-AP STAs based at least in part on information about at least one modulation and coding scheme, MCS, associated with a signal bandwidth for the uplink communication and a maximum transmit power value associated with the respective at least one MCS. In some embodiments of this aspect, the processing circuitry is configured to cause the MLD to select at least one of: the at least one first communication parameter value, the at least one second communication parameter value and the first and second non-AP STAs based at least in part on information about at least one modulation and coding scheme, MCS, for the uplink communication and a signal-to-interference-plus-noise ratio, SINR, required to successfully decode the uplink communication when transmitted according to the respective at least one MCS.

In some embodiments of this aspect, the processing circuitry is configured to cause the MLD to select at least one of: the at least one first communication parameter value, the at least one second communication parameter value and the first and second non-AP STAs based at least in part on information about at least one modulation and coding scheme, MCS, for the downlink communication and a signal-to-noise ratio, SNR, required to successfully decode the downlink communication when transmitted according to the respective at least one MCS.

In some embodiments of this aspect, the processing circuitry is configured to cause the MLD to select at least one of: the at least one first communication parameter value, the at least one second communication parameter value, and the first and second non-AP STAs based at least in part on: information about at least one modulation and coding scheme, MCS, for the uplink communication and a signal-to-interference-plus-noise ratio, SINR, required to successfully decode the uplink communication when transmitted according to the respective at least one MCS; and information about at least one MCS for the downlink communication and a signal-to-noise ratio, SNR, required to successfully decode the downlink communication when transmitted according to the respective at least one MCS.

In some embodiments of this aspect, the pair of the first link and the second link: is a non-STR pair of links for a first set of communication parameter values and is a STR pair of links for a second set of communication parameter values, the first set being different from the second set.

According to another aspect of the present disclosure, a method implemented in a simultaneous transmit and receive, STR, capable multi-link device, MLD, is provided. The MLD comprises an access point, AP, station, STA. The method comprises jointly scheduling an uplink communication on a first link and a simultaneous downlink communication on a second link by selecting a first non-access point, non-AP, station, STA for the uplink communication and a second non-AP STA for the simultaneous downlink communication out of a plurality of non-AP STAs, the first and second links being a STR constrained pair of links, the first link being associated with the first non-AP STA, the second link being associated with the second non-AP STA, and the first and second non-AP STAs not being affiliated with a same MLD.

In some embodiments of this aspect, jointly scheduling the simultaneous uplink and downlink communication further comprises selecting at least one of at least one first communication parameter value for the uplink communication and at least one second communication parameter value for the simultaneous downlink communication. In some embodiments of this aspect, selecting further comprises selecting the first non-AP STA for the uplink communication and the second non-AP STA for the simultaneous downlink communication out of the plurality of non-AP STAs based at least in part on path loss estimates for the plurality of non-AP STAs.

In some embodiments of this aspect, the at least one of the at least one first communication parameter value and the at least one second communication parameter value comprises a value of at least one of a transmit power, a signal bandwidth and a modulation and coding scheme, MCS, for the respective uplink and simultaneous downlink communications. In some embodiments of this aspect, selecting further comprises selecting at least one of: the at least one first communication parameter value, the at least one second communication parameter value and the first and second non-AP STAs based at least in part on a path loss estimate for each of the first and second non-AP STAs.

In some embodiments of this aspect, selecting further comprises selecting at least one of: the at least one first communication parameter value, the at least one second communication parameter value and the first and second non-AP STAs based at least in part on a signal to self-interference, SI, plus noise ratio for the uplink communication. In some embodiments of this aspect, selecting further comprises selecting at least one of: the at least one first communication parameter value, the at least one second communication parameter value and the first and second non-AP STAs based at least in part on a signal-to-noise ratio, SNR, for the downlink communication.

In some embodiments of this aspect, selecting further comprises selecting at least one of: the at least one first communication parameter value, the at least one second communication parameter value and the first and second non-AP STAs based at least in part on a signal to self-interference, SI, plus noise ratio for the uplink communication and a signal-to-noise ratio, SNR, for the downlink communication. In some embodiments of this aspect, selecting further comprises selecting at least one of: the at least one first communication parameter value, the at least one second communication parameter value and the first and second non-AP STAs based at least in part on a frequency separation between the first and second links.

In some embodiments of this aspect, selecting further comprises selecting at least one of: the at least one first communication parameter value, the at least one second communication parameter value and the first and second non-AP STAs based at least in part on information about at least one modulation and coding scheme, MCS, associated with a signal bandwidth for the downlink communication and at least one of a maximum transmit power value and a self-interference, SI, suppression value at the MLD. In some embodiments of this aspect, selecting further comprises selecting at least one of: the at least one first communication parameter value, the at least one second communication parameter value and the first and second non-AP STAs based at least in part on information about at least one modulation and coding scheme, MCS, associated with a signal bandwidth for the uplink communication and a maximum transmit power value associated with the respective at least one MCS.

In some embodiments of this aspect, selecting further comprises selecting at least one of: the at least one first communication parameter value, the at least one second communication parameter value and the first and second non-AP STAs based at least in part on information about at least one modulation and coding scheme, MCS, for the uplink communication and a signal-to-interference-plus-noise ratio, SINR, required to successfully decode the uplink communication when transmitted according to the respective at least one MCS. In some embodiments of this aspect, selecting further comprises selecting at least one of: the at least one first communication parameter value, the at least one second communication parameter value and the first and second non-AP STAs based at least in part on information about at least one modulation and coding scheme, MCS, for the downlink communication and a signal-to-noise ratio, SNR, required to successfully decode the downlink communication when transmitted according to the respective at least one MCS.

In some embodiments of this aspect, selecting further comprises selecting at least one of: the at least one first communication parameter value, the at least one second communication parameter value, and the first and second non-AP STAs based at least in part on: information about at least one modulation and coding scheme, MCS, for the uplink communication and a signal-to-interference-plus-noise ratio, SINR, required to successfully decode the uplink communication when transmitted according to the respective at least one MCS; and information about at least one MCS for the downlink communication and a signal-to-noise ratio, SNR, required to successfully decode the downlink communication when transmitted according to the respective at least one MCS. In some embodiments of this aspect, the pair of the first link and the second link: is a non-STR pair of links for a first set of communication parameter values and is a STR pair of links for a second set of communication parameter values, the first set being different from the second set.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 3 is a flowchart of an example process in an access point (AP) MLD according to some embodiments of the present disclosure.

DETAILED DESCRIPTION

Figure 1:
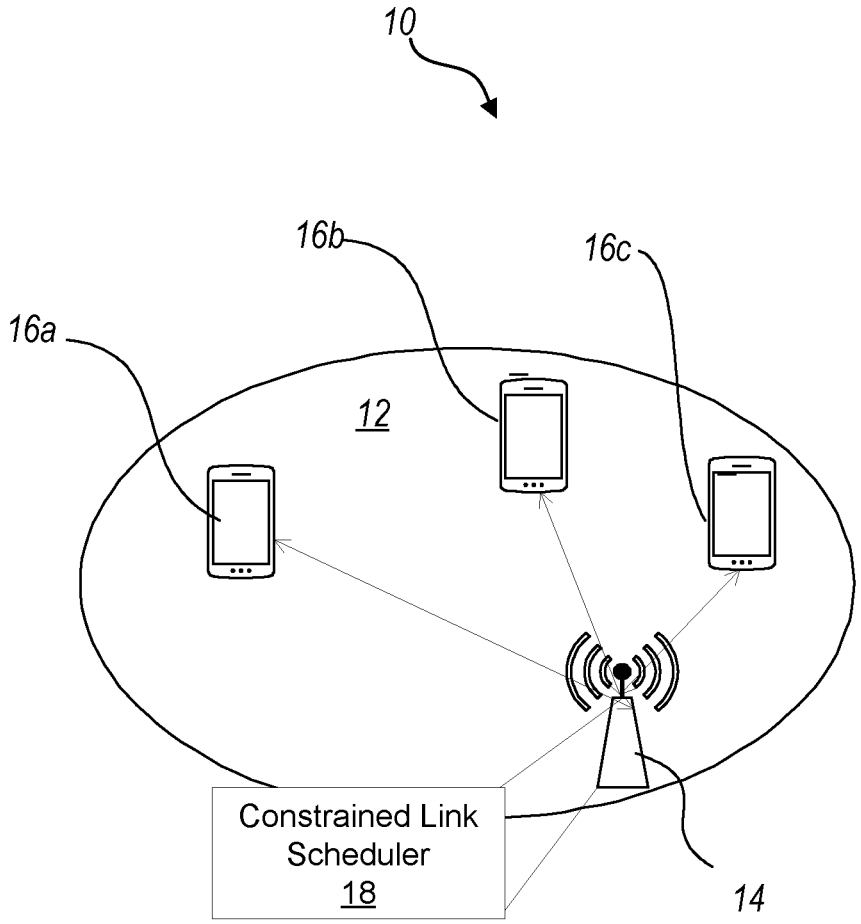
FIG. 1 illustrates an example system architecture according to some embodiments of the present disclosure.

As described above, the impact on STR capability at a constrained STR AP MLD is due to different factors. Such factors may include values of communication parameters such as signal bandwidths, transmit powers, frequency separation, etc. as well as the AP MLD's specific implementation parameters such as power amplifier distortion, transmit and receive filtering, etc. There is therefore a need at a constrained STR AP MLD for arrangements for joint DL/UL scheduling and/or selection of values of communication parameters (e.g., MCS, etc.).

When the two or more non-AP STAs in a multi-link operation (MLO) are located in the same device (e.g., non-AP MLD) and the frequency bands are not too far apart, both links in the MLO may largely experience the same path loss (only a minor difference due to different frequencies may be expected). In addition, to enable MLO, the in-device interference in both AP MLD and the non-AP MLD may have to be considered. Furthermore, the AP MLD will likely have a much better isolation between the two links that would help in SI suppression while undertaking MLOs using the two links, as compared to the non-AP MLD. This may be because isolation between links relates to cost to a large extent, and it may be expected that adding cost to an AP MLD to improve such isolation is generally more justified for AP MLDs, as compared to non-AP MLDs.

Some embodiments may provide for the AP MLD to be configured to set up the two or more different links in MLO at non-AP STAs that are within different (physically separate) devices (i.e., non-collocated non-AP STAs), in order to, for example, more fully make use of the AP MLD capabilities (i.e., not to unnecessarily restrict the ML communication based on the presumably lesser capabilities of the non-AP MLD). In this way the interference between the links for the non-AP STAs may not be in-device interference (i.e., self-interference), but rather interference between different devices. Such interference between different devices is generally significantly less than in-device interference.

Existing solutions related to constrained STR MLOs seem to assume that in-device interference is present also in the non-AP MLD, i.e., the non-AP STAs are located within the same device. This may be unnecessarily restricting, leading to the system not working as well as it could.

In some embodiments, the AP MLD may be configured to set up two or more different links in MLO at non-AP STAs that are not logical entities belonging to the same MLD, i.e., not affiliated with the same MLD. Such non-AP STAs may be non-collocated or, in some embodiments, may be collocated yet still not be affiliated with the same MLD.

Some embodiments of the present disclosure provide arrangements to design intelligent scheduling for constrained STR AP MLDs in order to optimize the joint DL/UL scheduling, which may take into account opportunities to schedule the different links in MLO to non-AP STAs that are not affiliated with the same MLD, or stated in the affirmative, to schedule the different links in MLO to non-AP STAs that are affiliated with different MLDs.

Some embodiments of the present disclosure provide arrangements to achieve efficient joint DL/UL scheduling and selection of values of communication parameters (e.g., MCS, etc.) for links in MLO at a constrained STR AP MLD.

Some embodiments of the proposed solution may be described as follows. The AP MLD may initially collect useful information, e.g., path loss (PL) on all links, for scheduling. Then, using this information and determining the amount of self-interference (SI) the AP MLD can cause in its own UL chain, the constrained STR AP MLD may e.g., intelligently select links, where the non-AP STAs are potentially not affiliated with the same MLD, and values of corresponding communication parameters (e.g., transmission powers, signal bandwidths, and MCS for simultaneous DL and UL transmissions). By doing so the adoption of MLOs may be exploited to a larger extent, as compared to existing arrangements, because jointly scheduled DL and UL transmissions at the AP MLD on concurrent/simultaneous links in ML may be supported with minimal disruptions and outages.

Some embodiments of the present disclosure may advantageously allow the constrained STR AP MLD to jointly and successfully schedule non-AP STAs and select values of communication parameters (e.g., MCS, etc.) on concurrent links to more effectively take advantage of ML transmissions, as compared to existing arrangements. In some embodiments, even if the AP MLD has constrained STR capabilities, it may be able to schedule simultaneous DL and UL transmissions whenever network conditions (e.g., availability of channels/links, buffered traffic, channel/link conditions, etc.) and/or the AP MLD's specific hardware characteristics allow.

With some embodiments proposed in this disclosure, the constrained AP MLD may be able to fully/better exploit the advantages of MLOs, especially considering the recent availability of a large amount of unlicensed spectrum.

Before describing in detail exemplary embodiments, it is noted that the embodiments reside primarily in combinations of apparatus components and processing steps related to joint DL/UL scheduling and parameter selection for constrained STR AP MLDs. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

In some embodiments, the non-limiting term "device" is used to describe a wireless device (WD) and/or user equipment (UE) that may be used to implement some embodiments of the present disclosure. The device may be a simultaneous transmit receive (STR) capable multi-link device (MLD). In some embodiments, the STR capable MLD may be and/or comprise an access point (AP) station (STA), in which the STR capable MLD may be called an STR capable AP MLD. In some embodiments, the STR capable MLD may be and/or comprise a non-access point (AP) station (STA), in which the STR capable MLD may be called an STR capable non-AP MLD. In some embodiments, the device may be a single-link device, such as a single-link non-AP STA. In some embodiments, the device may be any type of wireless device capable of communicating with a network node, such as an AP, over radio signals. The device may be any radio communication device, target device, a portable device, device-to-device (D2D) device, machine type device or device capable of machine to machine communication (M2M), low-cost and/or low-complexity device, a sensor equipped with a device, a computer, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

In some embodiments, the term "access point" or "AP" is used interchangeably and may comprise, or be a network node. The AP may include any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB), donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The AP may also comprise test equipment. The AP may comprise a radio router, a radio transceiver, a network controller, etc.

A device may be considered a node and may include physical components, such as processors, allocated processing elements, or other computing hardware, computer memory, communication interfaces, and other supporting computing hardware. The node may use dedicated physical components, or the node may be allocated use of the physical components of another device, such as a computing device or resources of a datacenter, in which case the node is said to be virtualized. A node may be associated with multiple physical components that may be located either in one location, or may be distributed across multiple locations.

The term "STR constrained" may be used here to describe a pair of links. It is noted that a link on its own (or individually) is not termed STR constrained. The classification 'STR constrained' is associated with a pair of links (or a plurality of links) and not a single link.

Some embodiments of the present disclosure provide that the AP MLD 14 is configured to jointly schedule the UL and DL for a STR constrained pair of links. "Jointly scheduling" in this context may be considered to mean that the AP MLD 14 schedules the UL transmission from one non-AP STA 16a simultaneously (and/or together, in a complimentary manner, in combination and/or in coordination) with the scheduling of the DL transmission to the other non-AP STA 16b. Joint scheduling may include one or more of selecting the particular non-AP STAs to use for a STR constrained pair of links and/or selecting communication parameter values for the STR constrained pair of links, as discussed in more detail throughout the disclosure. In other words, joint scheduling in this context may be considered scheduling the UL and/or DL in dependence on information related to both links in the STR constrained pair; instead of, for example, independently scheduling each of the UL and DL individually. For example, joint scheduling may include e.g., scheduling the UL and/or DL in dependence on path-loss estimates for both non-AP STAs 16a, 16b and/or selecting/determining one or more communication parameter values based on information related to both links in the STR constrained pair.

Even though the descriptions herein may be explained in the context of one of a Downlink (DL) and an Uplink (UL) communication, it should be understood that the basic principles disclosed may also be applicable to the other of the one of the DL and the UL communication. In some embodiments in this disclosure, the principles may be considered applicable to a transmitter and a receiver. For DL communication, the AP station is the transmitter and the receiver is the non-AP station. For the UL communication, the transmitter is the non-AP station and the receiver is the AP station.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices corresponding to a table, and/or one or more bit patterns representing the information.

In some embodiments, a "set" as used herein may be a set of 1 or more elements in the set.

Note also that some embodiments of the present disclosure may be supported by an Institute of Electrical Engineers (IEEE) 802.11 standard. IEEE 802.11 denotes a set of Wireless Local Area Network (WLAN) air interface standards developed by the IEEE 802.11 committee for short-range communications (e.g., tens of meters to a few hundred meters). Some embodiments may also be supported by standard documents disclosed in Third Generation Partnership Project (3GPP) technical specifications. That is, some embodiments of the description can be supported by the above documents. In addition, all the terms disclosed in the present document may be described by the above standard documents.

Note that although terminology from one particular wireless system, such as, for example, IEEE 802.11be, 3rd Generation Partnership Project (3GPP), Long Term Evolution (LTE), 5th Generation (5G) and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a device (e.g., MLD) described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Referring to the drawing figures, in which like elements are referred to by like reference numerals, there is shown in FIG. 1 a schematic diagram of the communication system 10, according to one embodiment, constructed in accordance with the principles of the present disclosure. The communication system 10 in FIG. 1 is a non-limiting example and other embodiments of the present disclosure may be implemented by one or more other systems and/or networks. Referring to FIG. 1, system 10 may comprise a wireless local area network (WLAN). The devices in the system 10 may communicate over one or more spectrums, such as, for example, an unlicensed spectrum, which may include frequency bands traditionally used by Wi-Fi technology. One or more of the devices may be further configured to communicate over other frequency bands, such as shared licensed frequency bands, etc. The system 10 may include a coverage area 12, which may be defined by the access point (AP) 14. The AP 14 may or may not be connectable to another network, such as a core network over a wired or wireless connection. The AP 14 may be a simultaneous transmit receive (STR) capable AP station (STA) multi-link device (MLD) (also referred to herein as AP MLD 14). The system 10 includes a plurality of non-AP devices, such as, for example, non-AP STAs 16a, 16b, 16c (collectively referred to as non-AP STAs 16). Each of the non-AP STAs 16 may be located in the coverage area 12 and may be configured to wirelessly connect to the AP MLD 14. Note that although one AP MLD 14 and three non-AP STAs 16 are shown for convenience, the communication system may include many more non-AP STAs and APs.

It should be understood that the system 10 may include additional nodes/devices not shown in FIG. 1. In addition, the system 10 may include many more connections/interfaces than those shown in FIG. 1. Thus, the elements shown in FIG. 1 are presented for ease of understanding.

Also, it is contemplated that a non-AP STA 16 can be in communication and/or configured to separately communicate with more than one AP 14 and/or more than one type of AP 14.

An AP MLD 14 is configured to include a constrained link scheduler 18 which is configured to jointly schedule an uplink communication on a first link and a simultaneous downlink communication on a second link by selecting a first non-access point, non-AP, station, STA for the uplink communication and a second non-AP STA for the simultaneous downlink communication out of a plurality of non-AP STAs, the first and second links being a STR constrained pair of links, the first link being associated with the first non-AP STA, the second link being associated with the second non-AP STA, and the first and second non-AP STAs not being affiliated with a same MLD.

Example implementations, in accordance with some embodiments, of an AP MLD 14 and a non-AP STA 16, will now be described with reference to FIG. 2.

The AP MLD 14 includes a communication interface 20, processing circuitry 22, and memory 24. The communication interface 20 may be configured to communicate with any of the nodes/devices in the system 10 according to some embodiments of the present disclosure. In some embodiments, the communication interface 20 may be formed as or may include, for example, one or more radio frequency (RF) transmitters, one or more RF receivers, and/or one or more RF transceivers, and/or may be considered a radio interface.

In some embodiments, the communication interface 20 may also include a wired interface.

The processing circuitry 22 may include one or more processors 26 and memory, such as, the memory 24. In particular, in addition to a traditional processor and memory, the processing circuitry 22 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 26 may be configured to access (e.g., write to and/or read from) the memory 24, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the AP MLD 14 may further include software stored internally in, for example, memory 24, or stored in external memory (e.g., database) accessible by the AP MLD 14 via an external connection. The software may be executable by the processing circuitry 22. The processing circuitry 22 may be configured to control any of the methods and/or processes described herein and/or to cause such methods, and/or processes to be performed, e.g., AP MLD 14. The memory 24 is configured to store data, programmatic software code and/or other information described herein. In some embodiments, the software may include instructions stored in memory 24 that, when executed by the processor 26 and/or constrained link scheduler 18 causes the processing circuitry 22 and/or configures the AP MLD 14 to perform the processes described herein with respect to the AP MLD 14 (e.g., processes described with reference to FIG. 3 and/or any of the other figures).

The non-AP STA 16 includes a communication interface 28, processing circuitry 30, and memory 32. The communication interface 28 may be configured to communicate with the AP MLD 14 and/or other elements in the system 10 according to some embodiments of the present disclosure. In some embodiments, the communication interface 28 may be formed as or may include, for example, one or more radio frequency (RF) transmitters, one or more RF receivers, and/or one or more RF transceivers, and/or may be considered a radio interface. In some embodiments, the communication interface 28 may also include a wired interface.

The processing circuitry 30 may include one or more processors 34 and memory, such as, the memory 32. In particular, in addition to a traditional processor and memory, the processing circuitry 30 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 34 may be configured to access (e.g., write to and/or read from) the memory 32, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the non-AP STA 16 may further include software stored internally in, for example, memory 32, or stored in external memory (e.g., database) accessible by the non-AP STA 16 via an external connection. The software may be executable by the processing circuitry 30. The processing circuitry 30 may be configured to control any of the methods and/or processes described herein and/or to cause such methods, and/or processes to be performed, e.g., by the non-AP STA 16. The memory 32 is configured to store data, programmatic software code and/or other information described herein. In some embodiments, the software may include instructions stored in memory 32 that, when executed by the processor 34, causes the processing circuitry 30 and/or configures the non-AP STA 16 to perform the processes described herein with respect to the non-AP STA 16.

Figure 2:
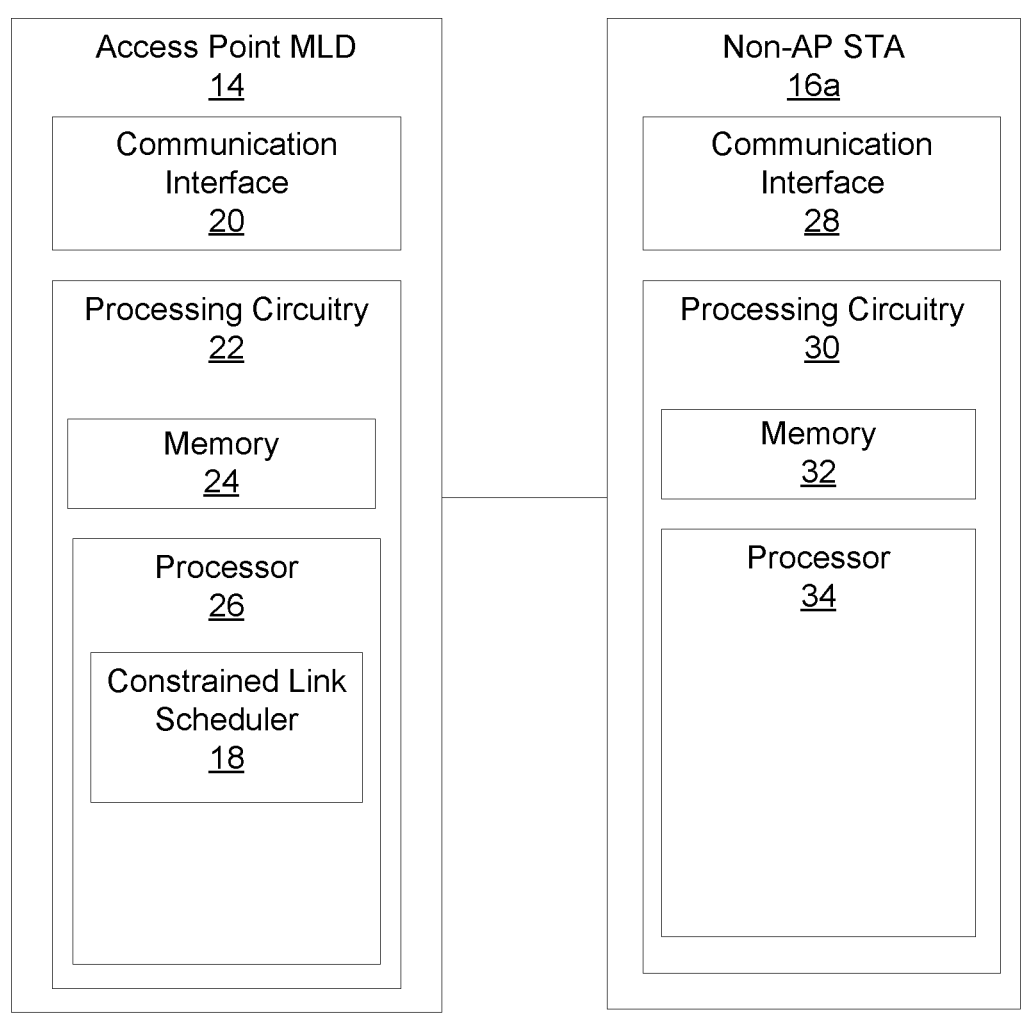
FIG. 2 illustrates another example system architecture and example hardware arrangements for devices in the system, according to some embodiments of the present disclosure.

In FIG. 2, the connection between the devices AP MLD 14 and the non-AP MLDs 16 is shown without explicit reference to any intermediary devices or connections. However, it should be understood that intermediary devices and/or connections may exist between these devices, although not explicitly shown.

Although FIG. 2 shows constrained link scheduler 18, as being within a processor, it is contemplated that this element may be implemented such that a portion of the element is stored in a corresponding memory within the processing circuitry. In other words, the element may be implemented in hardware or in a combination of hardware and software within the processing circuitry.

FIG. 3 is a flowchart of an example process in an AP for e.g., AP MLD 14 according to some embodiments of the present disclosure. One or more Blocks and/or functions and/or methods performed by the AP MLD 14 may be performed by one or more elements of AP MLD 14 such as by constrained link scheduler 18 in processing circuitry 22, memory 24, processor 26, communication interface 20, etc. according to the example process/method. The AP MLD 14 is a simultaneous transmit receive, STR, capable multi-link device, MLD, including at least one or more access point, AP, stations, STAs. The example process includes jointly scheduling (S100), such as via constrained link scheduler 18, processing circuitry 22, memory 24, processor 26 and/or communication interface 20, an uplink communication on a first link and a simultaneous downlink communication on a second link by selecting a first non-access point, non-AP, station, STA for the uplink communication and a second non-AP STA for the simultaneous downlink communication out of a plurality of non-AP STAs, the first and second links being a STR constrained pair of links, the first link being associated with the first non-AP STA, the second link being associated with the second non-AP STA, and the first and second non-AP STAs not being affiliated with a same MLD.

In some embodiments, jointly scheduling the simultaneous uplink and downlink communication further comprises selecting, such as via constrained link scheduler 18, processing circuitry 22, memory 24, processor 26 and/or communication interface 20, at least one of at least one first communication parameter value for the uplink communication and at least one second communication parameter value for the simultaneous downlink communication. In some embodiments, selecting further comprises selecting, such as via constrained link scheduler 18, processing circuitry 22, memory 24, processor 26 and/or communication interface 20, the first non-AP STA for the uplink communication and the second non-AP STA for the simultaneous downlink communication out of the plurality of non-AP STAs based at least in part on path loss estimates for the plurality of non-AP STAs.

In some embodiments, the at least one of the at least one first communication parameter value and the at least one second communication parameter value comprises a value of at least one of a transmit power, a signal bandwidth and a modulation and coding scheme, MCS, for the respective uplink and simultaneous downlink communications. In some embodiments, selecting further comprises selecting, such as via constrained link scheduler 18, processing circuitry 22, memory 24, processor 26 and/or communication interface 20, at least one of: the at least one first communication parameter value, the at least one second communication parameter value and the first and second non-AP STAs based at least in part on a path loss estimate for each of the first and second non-AP STAs.

In some embodiments, selecting further comprises selecting, such as via constrained link scheduler 18, processing circuitry 22, memory 24, processor 26 and/or communication interface 20, at least one of: the at least one first communication parameter value, the at least one second communication parameter value and the first and second non-AP STAs based at least in part on a signal to self-interference, SI, plus noise ratio for the uplink communication. In some embodiments, selecting further comprises selecting, such as via constrained link scheduler 18, processing circuitry 22, memory 24, processor 26 and/or communication interface 20, at least one of: the at least one first communication parameter value, the at least one second communication parameter value and the first and second non-AP STAs based at least in part on a signal-to-noise ratio, SNR, for the downlink communication.

In some embodiments, selecting further comprises selecting, such as via constrained link scheduler 18, processing circuitry 22, memory 24, processor 26 and/or communication interface 20, at least one of: the at least one first communication parameter value, the at least one second communication parameter value and the first and second non-AP STAs based at least in part on a signal to self-interference, SI, plus noise ratio for the uplink communication and a signal-to-noise ratio, SNR, for the downlink communication. In some embodiments, selecting further comprises selecting, such as via constrained link scheduler 18, processing circuitry 22, memory 24, processor 26 and/or communication interface 20, at least one of: the at least one first communication parameter value, the at least one second communication parameter value and the first and second non-AP STAs based at least in part on a frequency separation between the first and second links.

In some embodiments, selecting further comprises selecting, such as via constrained link scheduler 18, processing circuitry 22, memory 24, processor 26 and/or communication interface at least one of: the at least one first communication parameter value, the at least one second communication parameter value and the first and second non-AP STAs based at least in part on information about at least one modulation and coding scheme, MCS, associated with a signal bandwidth for the downlink communication and at least one of a maximum transmit power value and a self-interference, SI, suppression value at the MLD 14. In some embodiments, selecting further comprises selecting, such as via constrained link scheduler 18, processing circuitry 22, memory 24, processor 26 and/or communication interface 20, at least one of: the at least one first communication parameter value, the at least one second communication parameter value and the first and second non-AP STAs based at least in part on information about at least one modulation and coding scheme, MCS, associated with a signal bandwidth for the uplink communication and a maximum transmit power value associated with the respective at least one MCS.

In some embodiments, selecting further comprises selecting, such as via constrained link scheduler 18, processing circuitry 22, memory 24, processor 26 and/or communication interface at least one of: the at least one first communication parameter value, the at least one second communication parameter value and the first and second non-AP STAs based at least in part on information about at least one modulation and coding scheme, MCS, for the uplink communication and a signal-to-interference-plus-noise ratio, SINR, required to successfully decode the uplink communication when transmitted according to the respective at least one MCS.

In some embodiments, selecting further comprises selecting, such as via constrained link scheduler 18, processing circuitry 22, memory 24, processor 26 and/or communication interface at least one of: the at least one first communication parameter value, the at least one second communication parameter value and the first and second non-AP STAs based at least in part on information about at least one modulation and coding scheme, MCS, for the downlink communication and a signal-to-noise ratio, SNR, required to successfully decode the downlink communication when transmitted according to the respective at least one MCS.

In some embodiments, selecting further comprises selecting, such as via constrained link scheduler 18, processing circuitry 22, memory 24, processor 26 and/or communication interface at least one of: the at least one first communication parameter value, the at least one second communication parameter value, and the first and second non-AP STAs based at least in part on: information about at least one modulation and coding scheme, MCS, for the uplink communication and a signal-to-interference-plus-noise ratio, SINR, required to successfully decode the uplink communication when transmitted according to the respective at least one MCS; and information about at least one MCS for the downlink communication and a signal-to-noise ratio, SNR, required to successfully decode the downlink communication when transmitted according to the respective at least one MCS.

In some embodiments, the pair of the first link and the second link: is a non-STR pair of links for a first set of communication parameter values and is a STR pair of links for a second set of communication parameter values, the first set being different from the second set.

Having generally described arrangements for joint DL/UL scheduling and parameter selection for constrained STR AP MLDs, a more detailed description of some of the embodiments are provided as follows with reference to FIG. 4, and which may be implemented by AP MLD 14 and/or non-AP STA 16.

Some embodiments of the present disclosure will be described as applied to a system based on IEEE 802.11, also commonly referred to as Wi-Fi. Thus, the network node is denoted as an AP MLD (e.g., AP MLD 14) and a device connected to an AP MLD, such as user device, is denoted as a non-AP STA (e.g., non-AP STA 16).

In the examples described, it may be assumed that the AP is multi-link capable (i.e., AP MLD 14), and the AP MLD 14 can operate on two channels concurrently/simultaneously. In some embodiments, the AP MLD 14 may also operate on more than two links concurrently/simultaneously, and extension of this invention to such AP MLDs 14 is straightforward. For some embodiments of the proposed solution, it may not be relevant whether the non-AP STAs 16 are affiliated with MLDs or not, as such embodiments may be focused on the centralized scheduling at the AP MLD 14 only. Some embodiments of the present disclosure do not consider aspects related to in-device interference (also called "self-interference" or "SI") at non-AP devices. For simplicity here, it is assumed that the AP MLD 14 schedules at most one link from/to each non-AP device while scheduling an MLO.

When discussing multi-link operation, the notions of synchronous and asynchronous operation are sometimes used. Asynchronous operation may be considered to mean that the operation on the two channels/links may be undertaken independently without, e.g., considering the relative timing or any other aspects of the operation on each of the two links; whereas synchronous operation may be considered to mean that there are restrictions concerning, e.g., time-wise alignment of transmissions and/or receptions on the two links. Some embodiments of the present disclosure relate to the asynchronous operation scenario where the two links may be operated completely independently, and the AP MLD 14 is configured to schedule concurrent/simultaneous DL and UL asynchronous transmissions on the two links.

Figure 4:
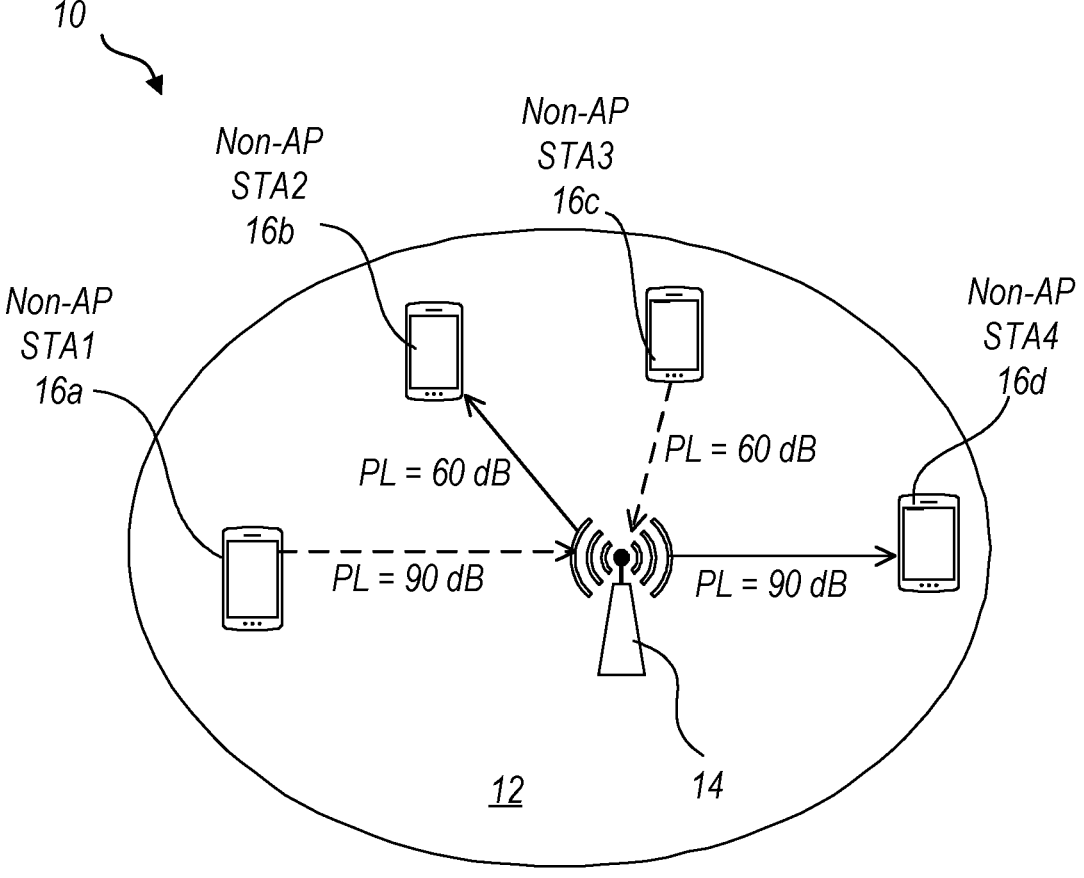
FIG. 4 illustrates an example of joint UL/DL scheduling at an AP MLD according to some embodiments of the present disclosure.

FIG. 4 shows one AP MLD 14 having DL traffic as indicated by the solid lined arrows from the AP MLD 14 and UL traffic as indicated by the dotted line arrows towards the AP MLD 14. The FIG. 4 example scenario shows DL traffic toward non-AP STA2 16b and non-AP STA4 16d and two non-STAs, non-AP STA1 16a and non-AP STA3 16c, having UL traffic. In this example, it is assumed that the AP MLD 14 has currently reserved two channels/links and is able to use its multi-link capabilities. In some embodiments, the AP MLD 14 may be in control of the scheduling and may therefore schedule transmissions on the two links in various ways. If the AP MLD 14 is STR capable it may schedule the transmissions on the two links completely independently. For example, the AP MLD 14 may select any TX power, MCS, signal bandwidth, and DL/UL mode on each link. This may be because for an STR capable AP MLD 14 the operations on the two links are considered to not affect each other and whether a transmission is successful on one link is considered completely independent of the operation on the other link. On the other hand, if the AP MLD 14 is non-STR capable, then there is a limitation in that the AP MLD 14 may use both links either for concurrent/simultaneous DL or for concurrent/simultaneous UL (still without any limitations on what transmit power or MCS or signal bandwidth should be used on each link in order not to harm the other concurrent link).

However, the situation is quite different for constrained STR AP MLDs 14. In a constrained AP MLD 14 there is a leakage from the DL transmit chain toward the UL receive chain used (we refer to this as self-interference, SI). Therefore, in some embodiments, operations (e.g., asynchronous operations) on the two links are not performed independently (e.g., as may conventionally be the case for asynchronous operations). In other words, some embodiments of the present disclosure provide for joint UL/DL scheduling (e.g., instead of independent UL and DL scheduling) so that information on both links can be correctly decoded.

There are many parameters affecting the amount of SI. Some of the parameters are implementation specific (e.g., power amplifier distortion, transmit/receive filters, radio frequency (RF) isolation, amount of non-linearity in the transmitted signal, usage and performance of SI cancellation algorithm, etc.); while others are communication parameters (TX power, MCS, signal bandwidth, frequency separation between channels/links, etc.). Some embodiments of the present disclosure provide for such joint UL/DL scheduling of multi-links at the AP MLD 14. In some embodiments, it may be assumed that the AP MLD 14 is aware of its implementation specific parameters and is able to, for a given TX power, signal bandwidth, and MCS selection, determine and/or compute the amount of SI it causes (e.g., via its DL transmission) to its own UL receiver. Moreover, in some embodiments, the AP MLD 14 knows and/or determines the channel state information (CSI) on all available links in its basic service set (BSS). Therefore, for a given TX power in UL, the AP MLD 14 may estimate the UL received power, and for a given TX power in DL, the AP MLD 14 may estimate if the data can be correctly received e.g., in a simultaneous UL reception. Since the non-AP STAs 16 may not be affiliated with the same MLD, the UL transmission from one non-AP STA 16 on one link may not cause any problem for the reception of a DL transmission by the other non-AP STA 16.

In some embodiments, the AP MLD 14 depicted in FIG. 4 may select/determine one or more of the following:

which two links to use (e.g., if more than two are available, select the two farthest in frequency);

the type of transmission on each link (DL or UL);

the receiver and the transmitter on both links; and/or at least one of TX power, signal bandwidth, and MCS to be used on each link (e.g., the DL TX power is selected so that the DL packet is received with a certain signal-to-noise (SNR)).

In some embodiments, the AP MLD 14 may jointly schedule the UL/DL and/or perform selection of values of communication parameters for the two links by using MCS, TX power, SI suppression and signal-to-interference plus noise ratio (SINR), etc. information, such as, for example, as represented in the following tables, Table 1, Table 2 and Table 3.

TABLE 1

Non-AP STA maximum TX power depending on selected MCS.

| Non-AP STA MCS | Non-AP STA Maximum TX power (dBm) |
|---|---|
| 0, 1, 2 | 15 |
| 3, 4 | 13.5 |
| 5, 6, 7 | 12 |
| 8, 9 | 10.5 |
| 10, 11 | 9 |

TABLE 1

AP MLD maximum TX power and SI Suppression depending on selected MCS.

| AP MLD MCS | AP MLD Maximum TX power (dBm) | AP MLD SI Suppression (dB) |
|---|---|---|
| 0, 1, 2 | 16 | 85 |
| 3, 4 | 14.5 | 90 |
| 5, 6, 7 | 13 | 95 |
| 8, 9 | 11.5 | 100 |
| 10, 11 | 10 | 105 |

TABLE 2

Approximate minimum required SINR at AP MLD or SNR at Non-AP STA for different MCSs.

| MCS | Approximate minimum required SINR/SNR (dB) |
|---|---|
| 0 | 0 |
| 1 | 2 |
| 2 | 5 |
| 3 | 8 |
| 4 | 10 |
| 5 | 15 |
| 6 | 17 |
| 7 | 18 |
| 8 | 22 |
| 9 | 24 |
| 10 | 28 |
| 11 | 30 |

Tables 1 and 2 show the non-AP STA 16 and AP MLD 14 maximum TX power as a function of the selected MCS. Additionally, Table 2 shows the AP MLD 14 SI suppression as a function of the MCS. Table 3 shows the approximate minimum required SINR at AP MLD 14 or SNR at non-AP STA 16 to successfully decode a received signal, per MCS. It should be noted that although the values in the tables are approximate and may largely vary in different devices, they are presented here merely to exemplify the operation of some embodiments of the present disclosure and such values may vary depending on the scenario.

Using the FIG. 4 scenario as an example, path loss (PL) on links AP MLD→STA4 and STA1→AP MLD are 90 dB each, and PL on links AP MLD→STA2 and STA3→AP MLD are dB each. Generally, higher values of PL occur because devices are farther away or because the channel between them is in deep fade. Moreover, assume a) that the AP MLD (e.g., AP MLD 14) needs to transmit a large amount of data to STA4 and therefore uses a high transmit power with MCS 7 for the DL transmission on link AP MLD→STA4, and b) that for the same reason STA1 uses MCS 7 in its UL transmission on link STA1→AP MLD. If the AP MLD 14 is STR constrained and does not account for SI when scheduling, it may schedule the DL transmission on link AP MLD→STA4 (at MCS 7) and the UL on link STA1→AP MLD (at MCS 7) at the same time. However, in such a scenario, the AP MLD 14 will fail in correctly receiving/decoding the UL data on link STA1→AP MLD because the high TX power on a simultaneous DL transmission on link AP MLD→STA4 would cause detrimental SI to the UL reception. This can be seen by analyzing the situation in FIG. 4 using, for example, a 20 MHz channel.

Under the given conditions, in FIG. 4, the DL transmission at the AP MLD 14 will be successful, while the UL transmission will fail to be correctly received/decoded by the AP MLD 14. For example, in Table 2 for the AP MLD's 14 DL transmission at MCS 7, the maximum TX power is 13 dBm and in FIG. 4 the PL for the DL link AP MLD→STA4 is 90 dB and if the noise floor is assumed to be at −96 dBm; thus, $SIR\_DL=13-90-(-96)=19$ dB, which is higher than the minimum required SNR (18 dB, see Table 3) to decode MCS 7 (refer to Tables 1-3 for the transmit power and required SINR/SNR values used in the computation). On the contrary, since the SI suppression by the AP MLD 14 at MCS 7 is 95 dB (see Table 2) the SI power at the AP MLD 14 is equal to $13-95=-82$ dBm and since the received power in UL is $12-90=-77$ dBm (see Table 1, where at the non-AP STA, MCS 7 corresponds to 12 dBm TX power and see FIG. 1 where the PL for the UL link is 90 dB) the corresponding SINR_UL=5 dB (SI power>>noise floor) which is lower than 18 dB, the minimum required SINR to decode MCS 7. With similar calculations it can be shown that if the AP MLD 14 uses MCS 7 on the DL link to STA4, the highest MCS that can be successfully decoded on the UL link STA1→AP MLD is MCS 2. For any other higher MCS used in the UL, the UL transmission fails. Therefore, if the SI is not accounted at the AP MLD 14, the UL transmissions may often fail. Generally speaking, scheduling a high TX power communication in DL and a high MCS transmission in UL is not a good strategy to adopt at an STR constrained AP MLD 14, especially with relatively small, received UL power.

In FIG. 4, an alternative scheduling selection/determination for e.g., a simultaneous transmit and receive (STR) MLO at the AP MLD 14 may be to schedule the DL transmission to STA4 (e.g., non-AP STA4 16d) along with the UL transmission from STA3 (e.g., non-AP STA3 16c), if, for example, the AP MLD 14 determines that STA3 has very little data to transmit and transmits with a low data rate MCS, e.g., MCS 0.

However, even if a higher MCS would be used for STA3, this may still be feasible since the receiver power in the UL may be higher due to the PL from STA3 (60 dB) being considerably less than the PL from STA1 (90 dB). In this case, the AP MLD 14 may be able to afford higher SI in the UL because MCS 0 may be decoded successfully, even in the presence of a relatively large amount of interference. For example, referring to FIG. 4 again, assume that MCS 7 is used with TX power=13 dBm in the DL to STA4 (PL=90 dB) and the noise floor is at −96 dBm. In this case, the SNR_DL=13−90−(−96)=−77−(−96)=19 dB, which is greater than the minimum required SNR to decode MCS 7. By using similar computations and using the values from Tables 1-3, it can be shown the UL from STA3 may even support MCS 11, due to the relatively low PL (60 dB) in the UL. Indeed, with MCS 11 in UL the SINR_UL equals (9-60)−(13-95)=31 dB (SI power>>noise floor), which is higher than the threshold (30 dB) required to successfully decode MCS 11. Thus, (9-60) dBm is the received power in UL, while (13-95) dBm is the SI power.

As another example, assume that in FIG. 4 the AP MLD 14 does not require a high power to transmit in DL toward STA2 (PL=60 dB on this link), while still using MCS 7. To decode MCS 7, the minimum SNR=18 dB is needed (see Table 3). If the AP MLD 14 uses the maximum allowed transmit power (13 dBm, see Table 2) on this DL link and the noise floor is assumed to be at −96 dBm, the corresponding SNR_DL equals 49 dB, which is unnecessarily high. Therefore, the AP MLD 14 may use power control and largely reduce transmit power to 13−30=−17 dBm. Then, the AP MLD 14 can schedule the UL transmission from STA3 (and even for STA1, which experiences higher PL=90 dB) with a higher MCS. Indeed, the SI is so low in this case (13−30−95=−112 dB) that the limiting factor becomes the noise rather than the SI, and there is room for correctly decoding a very high MCS in the UL. With the given information for this example and simple calculations using the values in Tables 1-3, it can be shown that MCS 11 can be decoded by the AP MLD 14 from STA3, while STA1 UL transmissions can only support MCS as high as MCS 5.

As can be discerned from the above examples, there is a benefit to joint scheduling of the UL and DL links and TX power and/or MCS selection at a constrained STR AP MLD 14. For example, by using PL information and MCS, transmit power, SI suppression, and SINR/SNR information, the constrained STR AP MLD 14 may intelligently select two links for STR and/or values of communication parameters that may allow both the DL and the simultaneous UL transmissions to be successfully received/decoded. Some embodiments of the present disclosure provide for the recipient of transmissions, the TX power and the MCS on each link to be jointly selected by the AP MLD 14 so that, for example, the amount of SI can be managed in the UL reception.

Some embodiments provide that the procedure at the AP MLD 14 e.g., in order to select the most suitable DL_MCS (MCS for DL) and UL_MCS (MCS for UL) may include one or more of the following:

1) selection of values of communication parameters (e.g., TX power and/or MCS) on both links (a. and b. below may be performed at the same time);

a. The AP MLD 14 selects DL_TX Power (TX power for DL) and DL_MCS so that for a given DL_PL (PL in DL) this transmission is successful. Then AP MLD 14 computes the amount of SI it causes to the UL reception.

b. The AP MLD 14 selects UL_TX Power (TX power for UL) and UL_MCS so that given a certain UL_PL (PL in UL), a certain UL RX power (RX power for UL) is achieved.

2) AP MLD 14 computes the quantity SSINR_UL (signal to SI plus noise ratio for UL) and compares such quantity with a certain threshold, which threshold may be a predetermined threshold and/or may depend on the selected UL_MCS. If the condition holds, then simultaneous asynchronous UL/DL transmissions on both the links will be successful.

It may be noted that, in some embodiments, the AP MLD 14 may only need an estimate of CSI on the AP-STAs links, as the hardware limitations (implementation specific parameters) of the AP MLD 14 may be assumed to be already known to the AP MLD 14.

Some embodiments provide a method for a wireless AP MLD 14 to jointly schedule simultaneous UL and DL operation using multiple STR constrained links. The method may include the values of communication parameters for all links being selected by the AP MLD 14 and where two non-AP STAs 16 involved in the UL and DL ML operation are not affiliated with the same MLD so that the interference caused by UL transmission from one of the non-AP STAs 16 can be assumed to not interfere with the DL reception on the other link at the other non-AP STA 16.

In some further embodiments, the AP MLD 14 selects the transmitting STAs for UL and receiving STAs for DL.

In some further embodiments, the communication parameters whose values are selected may include one or more of TX powers, MCSs, signal bandwidths, channel separation, etc.

In some further embodiments, the AP MLD 14 may, as part of the selection process, consider satisfying certain criteria for successful data reception for all links, including computation of an estimate of resultant signal to SI plus noise ratio for uplink transmissions.

In some further embodiments, the AP MLD 14 may, as part of the selection process, consider the PL estimates for each of the multiple links to select the values of the communication parameters.

| Abbreviation | Explanation |
| --- | --- |
| AP | Access Point |
| BSS | Basic Service Set |
| CSI | Channel State Information |
| DL | Downlink |
| FCC | Federal Communications Commission |
| MCS | Modulation and Coding Scheme |
| ML | Multi-Link |
| MLD | Multi-Link Device |
| MLO | Multi-Link Operation |
| PL | Path Loss |
| RF | Radio Frequency |
| RX | Receive or Receiver |
| SI | Self Interference |
| SNR | Signal-to-Noise Ratio |
| SINR | Signal-to-Interference-plus-Noise Ratio |
| STA | Station |
| STR | Simultaneous Transmit and Receive |
| TX | Transmit or Transmitter |
| UL | Uplink |

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A simultaneous transmit and receive, STR, capable multi-link device, MLD, comprising an access point, AP, station, STA, the MLD comprising processing circuitry, the processing circuitry configured to cause the MLD to:

jointly schedule an uplink communication on a first link and a simultaneous downlink communication on a second link by selecting a first non-access point, non-AP, station, STA for the uplink communication and a second non-AP STA for the simultaneous downlink communication out of a plurality of non-AP STAs, the first and second links being a STR constrained pair of links, the first link being associated with the first non-AP STA, the second link being associated with the second non-AP STA, and the first and second non-AP STAs not belonging to a same MLD;

cause the MLD to jointly schedule the simultaneous uplink and downlink communication by being further configured to cause the MLD to:

select at least one first communication parameter value for the uplink communication and at least one second communication parameter value for the simultaneous downlink communication, the at least one first communication parameter value and the at least one second communication parameter value comprising a value of a transmit power and a modulation and coding scheme, MCS, for the respective uplink and simultaneous downlink communications; and cause the MLD to select at least one of: the at least one first communication parameter value, the at least one second communication parameter value and the first and second non-AP STAs based at least in part on a signal to self-interference, SI, plus noise ratio for the uplink communication.

2. The MLD of claim 1, wherein the processing circuitry is configured to cause the MLD to:

select the first non-AP STA for the uplink communication and the second non-AP STA for the simultaneous downlink communication out of the plurality of non-AP STAs based at least in part on path loss estimates for the plurality of non-AP STAs.

3. The MLD of claim 1, wherein the processing circuitry is configured to cause the MLD to select at least one of: the at least one first communication parameter value, the at least one second communication parameter value and the first and second non-AP STAs based at least in part on a path loss estimate for each of the first and second non-AP STAs.

4. The MLD of claim 1, wherein the processing circuitry is configured to cause the MLD to select at least one of: the at least one first communication parameter value, the at least one second communication parameter value and the first and second non-AP STAs based at least in part on a signal-to-noise ratio, SNR, for the downlink communication.

5. The MLD of claim 1, wherein the processing circuitry is configured to cause the MLD to select at least one of: the at least one first communication parameter value, the at least one second communication parameter value and the first and second non-AP STAs based at least in part on a signal to self-interference, SI, plus noise ratio for the uplink communication and a signal-to-noise ratio, SNR, for the downlink communication.

6. The MLD of claim 1, wherein the processing circuitry is configured to cause the MLD to select at least one of: the at least one first communication parameter value, the at least one second communication parameter value and the first and second non-AP STAs based at least in part on a frequency separation between the first and second links.

7. The MLD of claim 1, wherein the pair of the first link and the second link:

is a non-STR pair of links for a first set of communication parameter values and is a STR pair of links for a second set of communication parameter values, the first set being different from the second set.

8. A method implemented in a simultaneous transmit and receive, STR, capable multi-link device, MLD, comprising an access point, AP, station, STA, the method comprising:

jointly scheduling an uplink communication on a first link and a simultaneous downlink communication on a second link by selecting a first non-access point, non-AP, station, STA for the uplink communication and a second non-AP STA for the simultaneous downlink communication out of a plurality of non-AP STAs, the first and second links being a STR constrained pair of links, the first link being associated with the first non-AP STA, the second link being associated with the second non-AP STA, and the first and second non-AP STAs not belonging to a same MLD, jointly scheduling the simultaneous uplink and downlink communication further comprises:

selecting at least one of at least one first communication parameter value for the uplink communication and at least one second communication parameter value for the simultaneous downlink communication, the at least one of the at least one first communication parameter value and the at least one second communication parameter value comprising a value of a transmit power and a modulation and coding scheme, MCS, for the respective uplink and simultaneous downlink communications; selecting further comprising selecting at least one of: the at least one first communication parameter value, the at least one second communication parameter value and the first and second non-AP STAs based at least in part on a signal to self-interference, SI, plus noise ratio for the uplink communication and a signal-to-noise ratio, SNR, for the downlink communication.

9. The method of claim 8, wherein selecting further comprises:

selecting the first non-AP STA for the uplink communication and the second non-AP STA for the simultaneous downlink communication out of the plurality of non-AP STAs based at least in part on path loss estimates for the plurality of non-AP STAs.

10. The method of claim 8, wherein selecting further comprises selecting at least one of: the at least one first communication parameter value, the at least one second communication parameter value and the first and second non-AP STAs based at least in part on a path loss estimate for each of the first and second non-AP STAs.

11. The method of claim 8, wherein selecting further comprises selecting at least one of: the at least one first communication parameter value, the at least one second communication parameter value and the first and second non-AP STAs based at least in part on a signal to self-interference, SI, plus noise ratio for the uplink communication.

12. The method of claim 8, wherein selecting further comprises selecting at least one of: the at least one first communication parameter value, the at least one second communication parameter value and the first and second non-AP STAs based at least in part on a signal-to-noise ratio, SNR, for the downlink communication.

13. The method of claim 8, wherein selecting further comprises selecting at least one of: the at least one first communication parameter value, the at least one second communication parameter value and the first and second non-AP STAs based at least in part on a frequency separation between the first and second links.

14. The method of claim 8, wherein the pair of the first link and the second link:

is a non-STR pair of links for a first set of communication parameter values and is a STR pair of links for a second set of communication parameter values, the first set being different from the second set.

* * * * *